United States Patent
Brewer et al.

(10) Patent No.: US 10,095,854 B2
(45) Date of Patent: *Oct. 9, 2018

(54) VEHICLE AUTHORIZATION BASED ON NEAR FIELD COMMUNICATION

(71) Applicant: International Business Machines Corporation, Armonk, NY (US)

(72) Inventors: Derek R. Brewer, Bowling Green, OH (US); Kerry M. Langford, Wanamingo, MN (US); Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,700

(22) Filed: Dec. 14, 2017

(65) Prior Publication Data
US 2018/0107817 A1 Apr. 19, 2018

Related U.S. Application Data

(63) Continuation of application No. 14/816,235, filed on Aug. 3, 2015.

(51) Int. Cl.
*G06F 7/04* (2006.01)
*G06F 12/00* (2006.01)
(Continued)

(52) U.S. Cl.
CPC .............. *G06F 21/32* (2013.01); *B60R 25/00* (2013.01)

(58) Field of Classification Search
CPC .. H04L 63/107; G06Q 40/08; G06Q 10/0635; G06Q 50/30; G06Q 50/265;
(Continued)

(56) References Cited

U.S. PATENT DOCUMENTS 6,091,326 A 7/2000 Castellano
8,344,890 B2 1/2013 Zhu et al.
(Continued)

FOREIGN PATENT DOCUMENTS

CN 20166294 12/2010
CN 102163299 A 8/2011
(Continued)

OTHER PUBLICATIONS

"Download Your ID Cards With GEICO Mobile"; GEICO; GEICO's Mobile Apps; Printed on: Apr. 27, 2015; © 1996-2015, Geico; pp. 1-2; <https://www.geico.com/about/mobile-apps/digital-ID-cards/>.

(Continued)

*Primary Examiner* — Daniel B Potratz
(74) *Attorney, Agent, or Firm* — Stephanie L. Carusillo

(57) ABSTRACT

In an approach for automated vehicle authorization. A processor receives a first set of credentials from at least a first near field communication device, wherein the first set of credentials indicates information about a person. A processor receives a second set of credentials from at least a second near field communication device, wherein the second set of credentials indicates information about a vehicle. A processor compares the first set of credentials to the second set of credentials. A processor determines whether the person indicated by the first set of credentials has authority to operate the vehicle, based on, at least, the comparison of the first set of credentials to the second set of credentials.

19 Claims, 4 Drawing Sheets

(51) Int. Cl.
  *G06F 12/14* (2006.01)
  *G06F 21/32* (2013.01)
  *B60R 25/00* (2013.01)

(58) Field of Classification Search
  CPC ..... H04W 4/046; H04W 4/008; H04W 12/06; G07C 2205/02; G06F 21/31; G06F 21/32; B60R 25/00; B60W 50/08
  See application file for complete search history.

(56) References Cited

U.S. PATENT DOCUMENTS

| | | | |
|---|---|---|---|
| 8,463,488 | B1 | 6/2013 | Hart |
| 8,587,435 | B2 | 11/2013 | Nguyen |
| 8,754,751 | B1 | 6/2014 | Picolli |
| 2007/0200663 | A1* | 8/2007 | White .................... A61B 5/117 340/5.31 |
| 2008/0082832 | A1 | 4/2008 | McDougal et al. |
| 2008/0093445 | A1 | 4/2008 | Greaves |
| 2009/0085725 | A1 | 4/2009 | Brookner et al. |
| 2010/0066513 | A1* | 3/2010 | Bauchot ................. B60R 25/10 340/426.1 |
| 2011/0087401 | A1 | 4/2011 | Tsao |
| 2012/0173128 | A1 | 7/2012 | Peeler |
| 2013/0126621 | A1 | 5/2013 | Zhu et al. |
| 2014/0187200 | A1* | 7/2014 | Reitter ................. H04W 12/08 455/410 |
| 2014/0257873 | A1 | 9/2014 | Hayward et al. |
| 2015/0025917 | A1 | 1/2015 | Stempora |
| 2015/0145695 | A1* | 5/2015 | Hyde .................... G06Q 40/08 340/905 |
| 2015/0241878 | A1 | 8/2015 | Crombez et al. |
| 2016/0171201 | A1* | 6/2016 | Schroder ............. H04B 5/0031 726/20 |
| 2017/0039356 | A1 | 2/2017 | Brewer et al. |

FOREIGN PATENT DOCUMENTS

| | | |
|---|---|---|
| CN | 103000079 A | 3/2013 |
| CN | 20299617 | 6/2013 |
| CN | 203078443 U | 7/2013 |
| DE | 202005007342 U1 | 7/2005 |
| EP | 2474954 A1 | 7/2012 |
| WO | 2015010758 A1 | 1/2015 |
| WO | WO-2015010758 A1 * | 1/2015 ........... H04B 5/0031 |

OTHER PUBLICATIONS

"GEICO digital ID card provides proof of auto insurance the smart way"; GEICO; Press Releases; Nov. 5, 2013; Nashington, D.C.; Printed on: Apr. 27, 2015; © 1996-2015, GEICO; pp. 1-3; <https://www.geico.com/about/pressreleases/2013/20131105/>.
IBM List of Patent Applications Treated As Related, Appendix P, Dated Dec. 14, 2017, 2 pages.

* cited by examiner

VEHICLE AUTHORIZATION BASED ON NEAR FIELD COMMUNICATION

BACKGROUND

The present invention relates generally to vehicle authorization and in particular to near field communication associated with different devices of the vehicle and operator.

Near field communication is a set of ideas and technology that enables smart phones and other devices to establish radio communication with each other by touching the devices together or bringing them into proximity to a distance. Near field communication standards cover communications protocols and data exchange formats and are based on existing radio-frequency identification standards including ISO/IEC 14443 and FeliCa.

Individual states and countries may require different types of vehicles to be registered, inspected, and/or covered by insurance as well as require each driver to have a valid driver's license. These requirements for operating a vehicle are monitored by either the driver, the police, or a governing authority to make sure the information is up-to-date and valid. This process requires a deal of manual work on behalf of the parties involved.

SUMMARY

Aspects of an embodiment of the present invention disclose an approach for automated vehicle authorization. In one embodiment, a processor receives a first set of credentials from at least a first near field communication device, wherein the first set of credentials indicates information about a person. In one embodiment, a processor receives a second set of credentials from at least a second near field communication device, wherein the second set of credentials indicates information about a vehicle. In one embodiment, a processor compares the first set of credentials to the second set of credentials. In one embodiment, a processor determines whether the person indicated by the first set of credentials has authority to operate the vehicle, based on, at least, the comparison of the first set of credentials to the second set of credentials.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit" or "system." Furthermore, aspects of the present invention may take the form of a computer program product embodied in one or more computer readable medium(s) having computer readable program code/instructions embodied thereon.

Embodiments of the present invention disclose an approach for determining if a request to start a vehicle has the proper validation through individual near field communication devices for receiving and/or sending information. Once embodiments of the present invention verify proper validation, the vehicle may be used by the operator. If proper validation is not verified, embodiments of the present invention immobilize the vehicle unless necessary override information is provided.

The present invention will now be described in detail with reference to the Figures.

Figure 1:
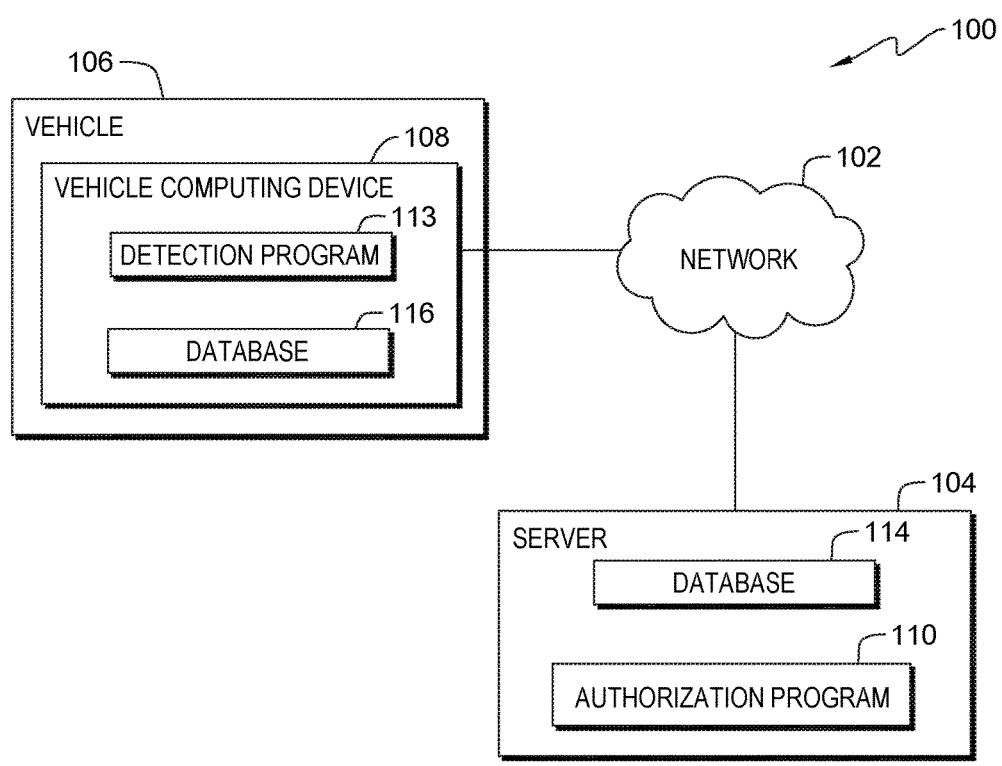
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102, server 104, and vehicle computing device 108 (which is a computing device located within vehicle 106). Computing environment 100 may include additional computing devices, servers, computers, components, or additional devices not shown. It should be appreciated that FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, the public switched telephone network (PSTN), any combination thereof, or any combination of connections and protocols support communications between server 104 and vehicle computing device 108, in accordance with embodiments of the invention. Network 102 may include wired, wireless, or fiber optic connections.

Server 104 may be a management server, a web server, or additional electronic device or computing system capable of processing program instructions and receiving and sending data. In some embodiments, server 104 may be a laptop computer, tablet computer, netbook computer, personal computer (PC), desktop computer, or any programmable electronic device capable of communicating with vehicle computing device 108 via network 102. In additional embodiments, server 104 may represent a server computing system utilizing multiple computers as a server system, such as in a cloud computing environment. In additional embodiments, server 104 represents a computing system utilizing clustered computers and nodes to act as a single pool of seamless resources. In the depicted embodiment, server 104 includes authorization program 110 and database 114. In additional embodiments, server 104 may include additional programs, storage devices, or components.

Vehicle 106 is a mobile machine which transports people or cargo. Examples of vehicle 106 are, but not limited to automobiles, motorcycles, trucks or buses. In the depicted embodiment, vehicle 106 includes vehicle computing device 108. In additional embodiments, vehicle 106 includes additional programs, storage devices, or components.

Vehicle computing device 108 may be any programmable electronic device located within vehicle 106 and capable of communicating with server 104 via network 102. In some embodiments, vehicle computing device 108 can control aspects of vehicle 106, such as, but not limited to, locking and unlocking doors, starting or stopping vehicle 106, and preventing or allowing an operator from starting or otherwise using vehicle 106. In additional embodiments, vehicle computing device 108 may be any electronic device or computing system capable of sending and receiving data, and communicating with server 104, authorization program 110, and database 114 via network 102. In the depicted embodiment, vehicle computing device 108 includes detection program 113 and database 116 and may include additional programs, storage devices, or components.

Detection program 113 receives information from near field communication devices (NFC) such as, for example, insurance documents, license plates, inspection documents, driver's licenses or driver's documents, and additional forms of identification which are equipped with a radio frequency identification (RFID), or other NFC device. In additional embodiments, detection program 113 may receive and send information to/from a computing device such as a smart phone or a tablet which includes information indicating, for example, insurance, license plate, inspection, driver's license or driver's documents, and/or additional forms of identification. In the depicted embodiment, detection program 113 is located on vehicle computing device 108. Detection program 113 also is able to communicate with server 104, authorization program 110, and database 114, and may be capable of communicating with additional devices, components, and programs, not shown, via network 102.

Authorization program 110 controls the authorization process to allow a driver to operate vehicle 106. The authorization process has several checks to determine if vehicle 106 is insured, registered, inspected, and otherwise safe to drive. This may encourage owners to keep up with appropriate renewals for license, registration, inspection, and insurance, as well as allow police officers to quickly check a motorist during a traffic stop. Authorization program 110 may be used in conjunction with a key-less start of a car's ignition system (with, for example, a Smart Fob or Smart Phone Application). In some embodiments, the authorization process also requires a driver to have a valid driver's license and also be preapproved to operate vehicle 106. Authorization program 110 communicates with vehicle computing device 108 via network 102. In one embodiment, authorization program 110 stores information regarding vehicle 106 and the driver in database 114, database 116, or another repository. In the depicted embodiment, authorization program 110 resides on server 104. In additional embodiments, authorization program 110 resides on another server or computing devices, provided authorization program 110 may access database 114, and vehicle computing device 108.

In some embodiments, an additional measure, a biometric confirmation, is employed within authorization program 110 to perform biometric recognition. Biometrics refers to technologies which measure and analyze human body characteristics, such as deoxyribonucleic acid (DNA), fingerprints, eye retinas and irises, voice patterns, facial patterns and hand measurements, for authentication purposes. In one embodiment, there is an override if vehicle 106 and the driver do not meet the requirements to otherwise operate vehicle 106. The override is used to allow a driver to operate vehicle 106 without the proper identification and verification. In another embodiment, there is an emergency exception to the authorization process. In one embodiment, authorization program 110 matches the driver's license photo with a snapshot of a driver's face while the driver is sitting behind the wheel of vehicle 106. Only after a positive match of the driver's license photo to the snapshot of the driver's face, via facial recognition techniques, would the driver to be able to operate vehicle 106. In additional embodiments, multiple authorized drivers may be programmed into vehicle computing device 108 so multiple drivers may operate vehicle 106. In some embodiments, the information is stored within vehicle computing device 108 in database 116, in case, for example, vehicle computing device 108 cannot communicate with server 104. For example, vehicle 106 may be in an underground garage, and may not have access to network 102. In additional embodiments, additional credential or necessary information may be stored on database 116 in case vehicle computing device 108 cannot communicate with network 102.

Authorization program 110 controls the authorizing of the necessary information to permit the driver to operate vehicle 106. Authorization program 110 also controls the signaling to vehicle 106 to start, or to not start because, by analyzing the information supplied to determine if the information is either incomplete or inaccurate. Authorization program 110 communicates with NFC devices, such as, for example, driver's license, registration, insurance, license plates, as well as biometrics, bar codes, magnetic stripes, optical character recognition, voice recognition, or additional forms of automatic identification and data capture (hereinafter AIDC). These and additional NFC devices are capable of either sending or receiving information, the ability to send or receive information is decided by the purpose of the NFC device. For example, a NFC device related to the driver's license or license plate sends information. Authorization program 110 is able to read the NFC devices and any information stored on the NFC devices. In the depicted embodiment, authorization program 110 is a function of authorization program 110 on server 104. In one embodiment, authorization program 110 alerts the driver within a predetermined time period from the date of expiration of the license, registration, inspection, and insurance.

Database 114 may be a repository which may be written to and/or read by authorization program 110. In one embodiment, information gathered by authorization program 110 may be stored to database 114. This information gathered by authorization program 110 is regarding the credentials for vehicle 106 and the driver. Such as driver's license information, insurance information, inspection information, or registration information. In one embodiment, database 114 is a database management system (DBMS) used to allow the definition, creation, querying, update, and administration of a database(s). In the depicted embodiment, database 114 is stored on server 104. In additional embodiments, database 114 may reside on another server or computing device, provided database 114 is accessible to authorization program 110.

Database 116 may be a repository which may be written to and/or read by vehicle computing device 108 and detection program 113. In one embodiment, information gathered by detection program 113 or authorization program 110 may be stored to database 114. This information gathered by authorization program 110 is regarding the credentials for vehicle 106 and the driver. Such as driver's license information, insurance information, inspection information, registration information, list of drivers authorized to operate vehicle 106, or pre-check authorization information. In one embodiment, database 114 is a database management system (DBMS) used to allow the definition, creation, querying, update, and administration of a database(s). In the depicted embodiment, database 114 is stored on vehicle computing device 108. In additional embodiments, database 114 may reside on an additional server, or an additional computing device, provided database 114 is accessible to detection program 113.

Figure 2:
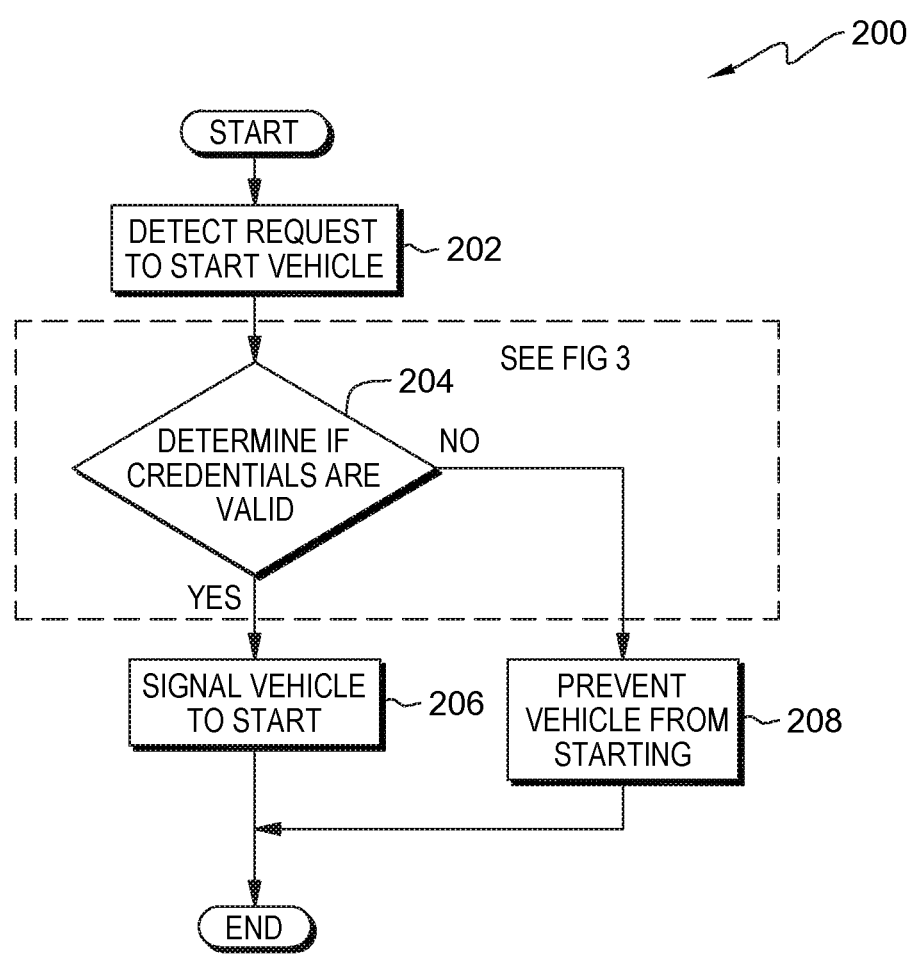
FIG. 2 depicts a flowchart of the operational step taken by an authorization program to detect and process a request to start a vehicle, within computing environment 100 of FIG. 1, in accordance with an embodiment of the present invention.

FIG. 2 depicts a flowchart of the operational step taken by detection program 113 to detect and process a request to start a vehicle, within computing environment 100 of FIG. 1, in accordance with an embodiment of the present invention. Flowchart 200 depicts the processing of receiving the request to start the vehicle and the validation process to verify the request is valid.

In step 202, detection program 113 detects a request to start vehicle 106. The request may come from, for example, a driver a key, Key Fob, smart phone application, additional forms of keyless entry, another activation device, or an activation code. In additional embodiments, the request may come from the driver from an external device, for example, an automatic starting system, a computer, or computing device. In additional embodiments, detection program 113 receives NFC credentials regarding vehicle 106 and the driver attempting to operate vehicle 106.

Figure 3:
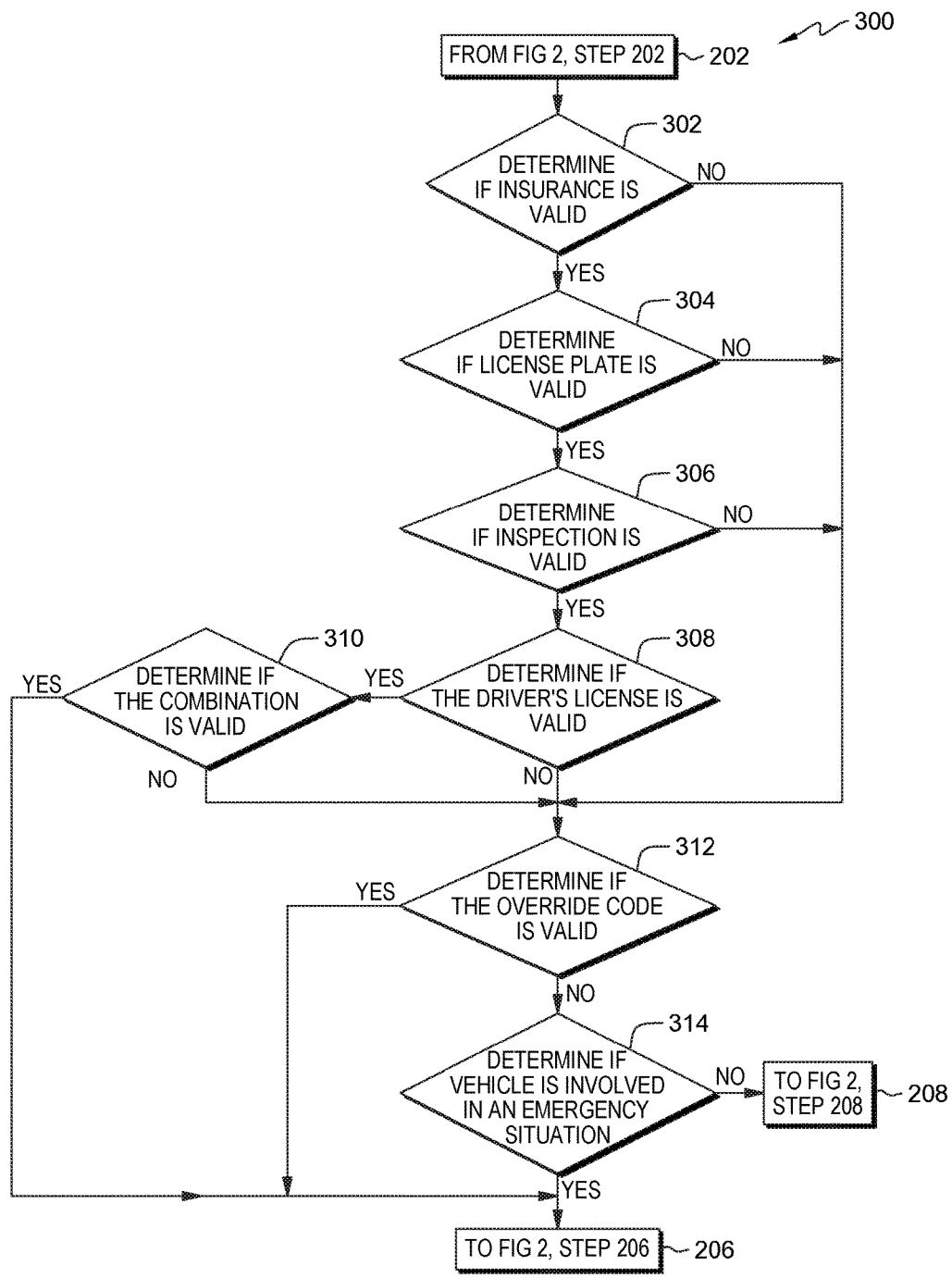
FIG. 3 depicts a flowchart of the operational step taken by an authorization program to determine if the request is valid to start a vehicle, within computing environment 100 of FIG. 1, in accordance with an embodiment of the present invention.

In decision 204, detection program 113 determines if the credentials are valid. In some embodiments, detection program 113 sends received credential information to authorization program 110, and as described in FIG. 3, authorization program 110 compares the credentials to various databases to determine whether the received credentials are valid. This step is explained in greater detail in FIG. 3 with regard to authorization program 110. In one embodiment, the steps described by authorization program 110 are performed by detection program 113 utilizing information from database 116. In one embodiment, detection program 113 sends a request to authorization program 110 regarding the credentials associated with vehicle 106. FIG. 3 describes the operational step taken by authorization program 110 to determine if the request is valid to start vehicle 106 through the validation of the RFID for each device. If detection program 113 determines that the credentials are valid (YES branch, proceed to step 206), detection program 113 causes vehicle 106 to start, or otherwise enables functionality of vehicle 106. If detection program 113 determines that the credentials are invalid (NO branch, proceed to step 208), detection program 113 prevents vehicle 106 from starting.

In step 206, detection program 113 signal vehicle 106 to start. In some embodiments, authorization program 110 sends a signal to detection program 113 informing detection program 113 which of the credentials are verified and they detection program 113 should permit the driver to engage vehicle's 106 engine or power source, and allow vehicle 106 to be operational. After detection program 113 signals vehicle 106 to start, the driver is now able to operate vehicle 106 on a public road or a public way. In additional embodiments, detection program 113 may be instructed to operate within private property, or additional areas which are not public roads or public ways. Such an embodiment may be applied to the use of farming or agricultural equipment, off-road vehicles, or vehicles which operate within international waters. In one embodiment, the information gathered by detection program 113 regarding vehicle 106 and the driver is reported to a third party, a computer, a computing device, or stored in database 114.

In step 208, detection program 113 prevents vehicle 106 from starting. In one embodiment, if authorization program 110 determines the credentials are not acceptable, authorization program 110 sends a signal to detection program 113 informing detection program 113 which of the credentials are not verified and that detection program 113 should not allow vehicle's 106 engine or power source to start. In one embodiment, detection program 113 reports the information relating to denying vehicle 106 the ability to start to a third party, a computer, a computing device, or stored in a repository, for example, database 114 or database 116. The information may be, for example, global positioning coordinates of vehicle 106, the credentials which are no longer valid, a visual image or video from an onboard camera, audio from an onboard microphone, or additional information which may be pertinent to why vehicle 106 is denied access to start. In additional embodiments, the driver may have additional opportunity to present the correct credentials after a predetermined time period. In one embodiment, detection program 113 grants the driver a set amount of attempts to input an override code to start vehicle 106, before locking out the driver. In one embodiment, detection program 113 alerts the authorities if vehicle 106 is disallowed to start. In additional embodiments, detection program 113 contacts the authorities to communicate with the driver.

FIG. 3 depicts a flowchart of the operational step taken by authorization program 110 to determine if the request is valid to start a vehicle, within computing environment 100 of FIG. 1, in accordance with an embodiment of the present invention. Flowchart 300 depicts the individual validation steps to determine if the request to operate vehicle 106 is valid, based on credentials received via RFID or other NFC devices.

In decision 302, authorization program 110 determines if the insurance is valid. The insurance may be valid if, for example, the insurance is through a verified provider, has not expired, meets a set of predetermined requirements regarding coverage and certified drivers for vehicle 106. The information is verified by, for example, accessing the insurance provider's website via network 102, gathering the information from database 114 or database 116, or additional means of gathering the information from the insurance provider. If authorization program 110 determines the insurance is valid (YES branch, proceed to decision 304), authorization program 110 proceeds to determine if the license plate is valid. If authorization program 110 determines the insurances is not valid (NO branch, proceed to decision 312), authorization program 110 proceeds to determine if the override code is valid. In one embodiment, authorization program 110 determines the insurance card is valid through a smart insurance card. The smart insurance card uses a RFID chip integrated into the smart insurance card which authorization program 110 reads through vehicle computing device 108 via network 102. In an additional embodiment, authorization program 110 records each determination of the insurance in a repository such as database 114. In one embodiment, authorization program 110 communicates with detection program 113 via network 102 to gather the information relating to the insurance.

In decision 304, authorization program 110 determines if the license plate is valid. The license plate may, for example, have a RFID chip integrated into the license plate including necessary information regarding the make, model, and owner of vehicle 106. The license plate is valid if the license plate is registered with the appropriate governing bodies, is verified to match with vehicle 106 identification code, or located correctly on vehicle 106 for proper visibility. If authorization program 110 determines the license plate is valid (YES branch, proceed to decision 306), authorization program 110 proceeds to determine if the inspection is valid. If authorization program 110 determines the license plate is not valid (NO branch, proceed to decision 312), authorization program 110 proceeds to determine if the override code is valid. In one embodiment, authorization program 110 determines the license plate is valid through a smart license plate. The smart license plate uses a RFID chip integrated into the smart license plate which authorization program 110 reads through an onboard computer in vehicle 106 over network 102. In an additional embodiment, authorization program 110 records each determination of the license plate in a repository such as database 114. In one embodiment, authorization program 110 communicates with detection program 113 via network 102 to gather the information relating to the license plate.

In decision 306, authorization program 110 determines if the inspection is valid. The inspection is valid if the inspection is performed by a certified mechanic, meets the requirements set forth by the governing body, is presented on vehicle 106 as required by the governing body, or is a vehicle 106 which does not require an inspection. If authorization program 110 determines the inspection is valid (YES branch, proceed to decision 308), authorization program 110 proceeds to determine if the driver's license is valid. If authorization program 110 determines the inspection is not valid (NO branch, proceed to decision 312), authorization program 110 proceeds to determine if the override code is valid. In one embodiment, authorization program 110 determines the inspection is valid through a smart inspection sticker. The smart inspection sticker uses a RFID chip integrated into the smart inspection sticker which authorization program 110 reads through an onboard computer in vehicle 106 over network 102. In an additional embodiment, authorization program 110 records each determination of the inspection in a repository such as database 114. In one embodiment, authorization program 110 communicates with detection program 113 via network 102 to gather the information relating to the inspection of vehicle 106.

In decision 308, authorization program 110 determines if the driver's license is valid. A driver's license may have NFC technology incorporated to allow a NFC receiver to gather information from the driver's license. the information is gathered by detection program 113 when the driver is in vehicle 106, or within reach of the NFC receiver located on or within vehicle 106 and sent to authorization program 110 to make the determination if the driver's license is valid or not. To verify the driver's license is valid, some factors may be, for example, if the driver's license is processed by the correct governing body, has not expired, is the proper class or rank for vehicle 106, or has not been modified or altered. The proper class of vehicle 106 relates to the different driving licenses related to the type of vehicle, vehicle 106 is. For example, a car requires a different driver's license than a bus, motorcycle, boat, tractor trailer, or motorhome. In some embodiments, additional attributes may be associated with the driver's license regarding times when the driver may operate the vehicle, or which vehicles the driver may operate. For example keeping night-vision impaired drivers from driving at night, keeping children from unauthorized use of an expressly prohibited car, allow an insurance company to govern the compliance of specific drivers for specific vehicles, and preventing thieves from stealing and using license plates on additional vehicles.

If, in decision 308, authorization program 110 determines if the driver's license is valid (YES branch, proceed to decision 310), authorization program 110 proceeds to determine if the combination is valid. If authorization program 110 determines the driver's license is not valid (NO branch, proceed to decision 312), authorization program 110 proceeds to determine if the override code is valid. In one embodiment, authorization program 110 determines the driver's license is valid through a smart driver's license. The smart driver's license uses a RFID chip integrated into the smart driver's license which authorization program 110 reads through an onboard computer in vehicle 106 over network 102. In additional embodiments, authorization program 110 uses forms of biometric identification, for example, fingerprint, hand geometry, retina and iris scan, facial recognition, voice analysis, and additional forms of biometric identification to determine driver are approved to operate vehicle 106. In an additional embodiment, authorization program 110 records each determination of the inspection in a repository such as database 114.

In decision 310, authorization program 110 determines if a combination is valid. The combination is the credentials which are used to verify vehicle 106 and the driver to determine if vehicle 106 is safe to operate and the driver is verified to drive vehicle 106. The combination is valid if the prior information is correct based on vehicle 106 requirements and the information related to the driver. In the depicted embodiment, if the credentials listed in steps 302 through 308 are required to be verified for the combination to be valid. In additional embodiments, the credentials are required to be verified. This may be due to different towns, counties, states, nations, or additional regions having different requirements as to what a driver is required to have and what requirements a vehicle (e.g., vehicle 106) is required to have before allowing the vehicle to operate on a public road, or a public way. In additional embodiments, additional credentials may be required which are processed in a similar method by authorization program 110, the use of additional credentials being, for example due to government requirements which a driver must produce regarding themselves and vehicle 106 which the driver is attempting to operate. If authorization program 110 determines the combination is valid (YES branch, proceed to step 206), authorization program 110 proceeds to signal vehicle to start. If authorization program 110 determines the insurances is not valid (NO branch, proceed to decision 312), authorization program 110 proceeds to determine if an override code is valid.

In decision 312, authorization program 110 determines if an override code is valid. The override code may be used if vehicle 106 needs to be taken to a location to renew or update the information which caused error, or the override code may be used if the driver was locked out of vehicle 106 because of too many attempts at starting vehicle 106. An override code allows a driver who is not approved to operate vehicle 106, use vehicle 106. The override code may be, for example, a code, a device, or a verification from a third party to allow the driver which was not approved to operate vehicle 106. If authorization program 110 determines the override code is valid (YES branch, proceed to step 206), authorization program 110 proceeds to signal vehicle to start. If authorization program 110 determines the override code is not valid (NO branch, proceed to decision 312), authorization program 110 proceeds to determine if the situation vehicle 106 is in is an emergency situation. In one embodiment, there is one override code for the driver. In additional embodiments, there may be several override codes, associated with each validation and specific to the driver. In one embodiment, authorization program 110 communicates with detection program 113 via network 102 to gather the information relating to the override code.

In decision 314, authorization program 110 determines if vehicle 106 is involved in an emergency situation. An emergency situation is a situation which poses an immediate risk to health, life, property, or environment. The emergency situation may require urgent intervention to prevent a worsening of the situation. In one embodiment, the driver, a third party, or an emergency personnel may determine if the situation vehicle 106 is in is an emergency situation. In additional embodiments, authorization program 110 gathers information relating to the situation of vehicle 106 through detection program 113 which accesses vehicle computing device 108 which may include information relating to the condition of vehicle 106 or information gathered from sensors or additional devices within vehicle 106. In additional embodiments, an external source determines if the situation vehicle 106 is in is an emergency situation, and permits the driver to operate vehicle 106. If authorization program 110 determines vehicle 106 is in an emergency situation (YES branch, proceed to step 206), authorization program 110 communicates with detection program 113, informing detection program 113 to signal vehicle to start. If authorization program 110 determines vehicle 106 is not in an emergency situation (NO branch, proceed to step 206), authorization program 110 communicates with detection program 113, informing detection program 113 to disallow the vehicle from start.

In additional embodiments, authorization program 110 reports an accident to a third party which determines if the situation vehicle 106 is involved in is an emergency situation. Authorization program 110 communicates with detection program 113 regarding vehicle's 106 internal computer systems which may include information regarding a potential emergency situation, such as, air bag deployment, crash sensor information, or audio or visual information relating to the occupants and the area around vehicle 106. In additional embodiments, authorization program 110 alerts an emergency service once, authorization program 110 receives an indication vehicle 106 is involved in an accident or additional emergency situation. In additional embodiments, if the driver calls 911 while in vehicle 106, authorization program 110 determines the situation vehicle 106 is involved in an emergency situation. In additional embodiments, once authorization program 110 determines vehicle 106 is involved in an emergency situation, authorization program 110 activates vehicle 106's global positioning system (hereinafter GPS), on-board camera, and audio system to record the driver and passengers and broadcasts the information to the proper authorities.

In additional embodiments, for vehicular accidents, the RFID tags used in conjunction with vehicle impact sensors may provide vehicle ownership information in certain circumstances such as hit and run accidents. For example, vehicle 106 gets struck in a parking lot. An impact or shock sensor of vehicle 106 detects the incident and vehicle computing device 108 activates one of the reachable RFID tags, to gather information from the additional vehicle involved in the incident. An owner could take the information to law enforcement and officers could investigate based on the nearest RFID tags in proximity at the time of the accident.

Figure 4:
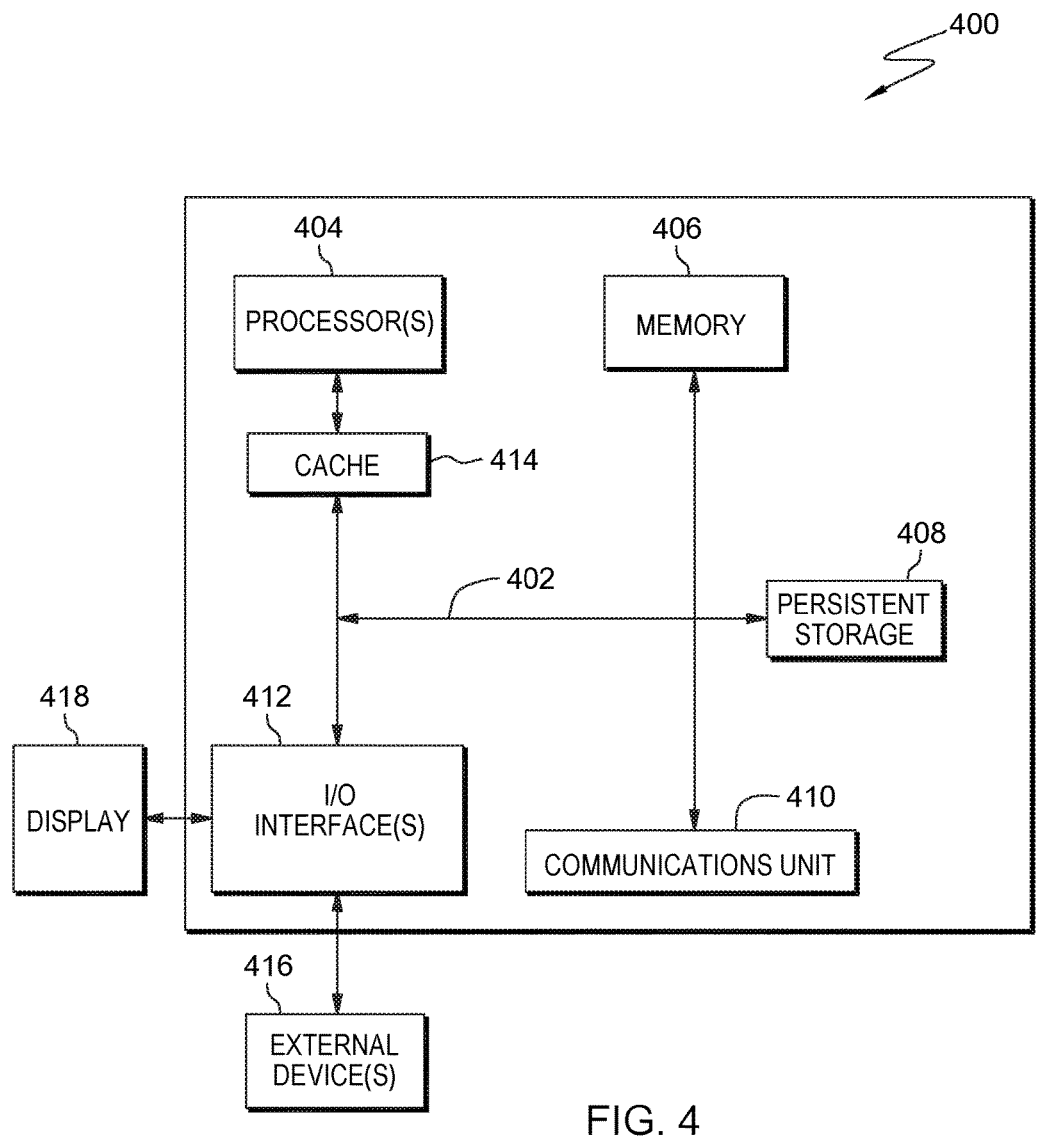
FIG. 4 depicts a block diagram depicting the internal and external components of the server of FIG. 1, in accordance with one embodiment of the present invention.

FIG. 4 depicts a block diagram 400 depicting the internal and external components of the server and the vehicle computing device of FIG. 1, in accordance with one embodiment of the present invention. It should be appreciated FIG. 4 provides only an illustration of one implementation and does not imply any limitations with regard to the environments in which different embodiments may be implemented. Many modifications to the depicted environment may be made.

Server 104 and vehicle computing device 108, each include communications fabric 402, which provides communications between computer processor(s) 404, memory 406, persistent storage 408, communications unit 410, and input/output (I/O) interface(s) 412. Communications fabric 402 may be implemented with any architecture designed for passing data and/or control information between processors (such as microprocessors, communications and network processors, etc.), system memory, peripheral devices, and any additional hardware components within a system. For example, communications fabric 402 may be implemented with one or more buses.

Memory 406 and persistent storage 408 are computer-readable storage media. In one embodiment, memory 406 includes random access memory (RAM) and cache memory 414. In general, memory 406 may include any suitable volatile or non-volatile computer-readable storage media.

Memory 406 is stored for execution by one or more of the respective computer processors 404 of server 104 and vehicle computing device 108 via one or more respective memories of memory 406 of server 104 and vehicle computing device 108. In the depicted embodiment, persistent storage 408 includes a magnetic hard disk drive. Alternatively, or in addition to a magnetic hard disk drive, persistent storage 408 may include a solid state hard drive, a semiconductor storage device, read-only memory (ROM), erasable programmable read-only memory (EPROM), flash memory, or any additional computer-readable storage media which is capable of storing program instructions or digital information.

The media used by persistent storage 408 may also be removable. For example, a removable hard drive may be used for persistent storage 408. Additional examples include optical and magnetic disks, thumb drives, and smart cards which are inserted into a drive for transfer onto additional computer-readable storage medium which is also part of persistent storage 408.

Communications unit 410, in the examples, provides for communications with additional data processing systems or devices, including server 104 and vehicle computing device 108. In the examples, communications unit 410 includes one or more network interface cards. Communications unit 410 may provide communications through the use of either or both physical and wireless communications links.

I/O interface(s) 412 allows for input and output of data with additional devices which may be connected to server 104 and vehicle computing device 108. For example, I/O interface 412 may provide a connection to external devices 416 such as a keyboard, keypad, camera, a touch screen, and/or some additional suitable input device. External devices 416 may also include portable computer-readable storage media such as, for example, thumb drives, portable optical or magnetic disks, and memory cards. Software and data used to practice embodiments of the present invention, e.g., function of authorization program 110 and detection program 113 may be stored on such portable computer-readable storage media and may be loaded onto persistent storage 408 of server 104 and vehicle computing device 108 via I/O interface(s) 412 of server 104 and vehicle computing device 108. Software and data used to practice embodiments of the present invention, e.g., authorization program 110 and detection program 113 may be stored on such portable computer-readable storage media and may be loaded onto persistent storage 408 of server 104 and vehicle computing device 108 via I/O interface(s) 412 of server 104 and vehicle computing device 108. I/O interface(s) 412 also connect to a display 418.

Display 418 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device which may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium which may direct a computer, a programmable data processing apparatus, and/or additional devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a device, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for automated vehicle authorization, the method comprising:
   dynamically determining, by one or more processors, which credentials for a person and a first vehicle are required based on the location of the first vehicle;
   receiving a first set of credentials from at least a first near field communication device, wherein the first set of credentials indicates information about the person, and wherein the information about the person comprises a license document and a restriction on what time of day the person may operate any vehicle;
   receiving a second set of credentials from at least a second near field communication device, wherein the second set of credentials indicates information about the first vehicle, and wherein the information about the first vehicle comprises a restriction on what type of roadway the first vehicle can be operated;
   comparing, by one or more processors, the first set of credentials to the second set of credentials;
   determining, by one or more processors, whether the person indicated by the first set of credentials has authority to operate the first vehicle, based on, at least, the comparison of the first set of credentials to the second set of credentials and a current time of day;
   determining, by one or more processors, that a date of expiration of the license document is within a predetermined time period;
   sending, by one or more processors, an alert that the date of expiration of the license document is within the predetermined time period;
   receiving, by one or more processors, an indication of an emergency from the person;
   alerting, by one or more processors, an emergency service of the indication of the emergency;
   activating, by one or more processors, at least one device capable of monitoring an aspect of the emergency;
   receiving data from the at least one device capable of monitoring an aspect of the emergency of the first vehicle;
   determining, by one or more processors, that the first vehicle has been involved in an accident, based on the received data;
   causing, by one or more processors, a near field communication device reader to scan for a third set of credentials from at least a third near field communication device associated with a second vehicle, wherein the third set of credentials is associated with the second vehicle; and
   storing, by one or more processors, the third set of credentials.

2. The method of claim 1, wherein the first set of credentials further comprises a biometric identifier, wherein the biometric identifier is a facial recognition device that compares a snapshot of the person's face to the license document photo.

3. The method of claim 1, wherein the second set of credentials comprises at least one of a license plate and an inspection document.

4. The method of claim 1, further comprising:
   responsive to determining that the person indicated by the first set of credentials has authority to operate the first vehicle, permitting, by one or more processors, the first vehicle to be operated.

5. The method of claim 1, further comprising:
   responsive to determining that the person indicated by the first set of credentials does not have authority to operate the first vehicle, requesting, by one or more processors, input of an override code;
   receiving the override code; and
   permitting, by one or more processors, the first vehicle to be operated.

6. The method of claim 1, wherein the third set of credentials is associated with an operator of the second vehicle.

7. The method of claim 1, wherein the type of roadway is a private property.

8. A computer program product for automated vehicle authorization, the computer program product comprising:
   one or more computer readable storage media and program instructions stored on the one or more computer readable storage media, the program instructions comprising:
      program instructions to dynamically determine which credentials for a person and a first vehicle are required based on the location of the first vehicle;
      program instructions to receive a first set of credentials from at least a first near field communication device, wherein the first set of credentials indicates information about a person, and wherein the information about the person comprises a license document and a restriction on what time of day the person may operate any vehicle;
      program instructions to receive a second set of credentials from at least a second near field communication device, wherein the second set of credentials indicates information about a first vehicle, and wherein the information about the first vehicle comprises a restriction on what type of roadway the first vehicle can be operated;
      program instructions to compare the first set of credentials to the second set of credentials;
      program instructions to determine whether the person indicated by the first set of credentials has authority to operate the first vehicle, based on, at least, the comparison of the first set of credentials to the second set of credentials and a current time of day;
      program instructions to determine that a date of expiration of the license document is within a predetermined time period;
      program instructions to send an alert that the date of expiration of the license document is within the predetermined time period;
      program instructions to receive an indication of an emergency from the person;
      program instructions to alert an emergency service of the indication of the emergency;
      program instructions to activate at least one device capable of monitoring an aspect of the emergency;
      program instructions to receive data from the at least one device capable of monitoring an aspect of the emergency of the first vehicle;
      program instructions to determine that the first vehicle has been involved in an accident, based on the received data;
      program instructions to cause a near field communication device reader to scan for a third set of credentials from at least a third near field communication device associated with a second vehicle, wherein the third set of credentials is associated with the second vehicle; and program instructions to store the third set of credentials.

9. The computer program product of claim 8, further comprising:
program instructions, stored on the computer readable storage media for execution by at least one of the one or more processors, to, responsive to determining that the person indicated by the first set of credentials does not have authority to operate the first vehicle request input of an override code;
program instructions, stored on the computer readable storage media for execution by at least one of the one or more processors, to receive the override code; and
program instructions, stored on the computer readable storage media for execution by at least one of the one or more processors, to permit the first vehicle to be operated.

10. The computer program product of claim 8, wherein the type of roadway is a private property.

11. The computer program product of claim 8, wherein the first set of credentials further comprises a biometric identifier, wherein the biometric identifier is a facial recognition device that compares a snapshot of the person's face to the license document photo.

12. The computer program product of claim 8, wherein the second set of credentials comprises at least one of a license plate and an inspection document.

13. The computer program product of claim 8, further comprising:
program instructions to, responsive to determining that the person indicated by the first set of credentials has authority to operate the first vehicle, permit the first vehicle to be operated.

14. The computer program product of claim 8, wherein the third set of credentials is associated with an operator of the second vehicle.

15. A computer system for automated vehicle authorization, the computer system comprising:
one or more computer processors, one or more computer readable storage media, and program instructions stored on the one or more computer readable storage media for execution by at least one of the one or more processors, the program instructions comprising:
program instructions to dynamically determine which credentials for a person and a first vehicle are required based on the location of the first vehicle;
program instructions to receive a first set of credentials from at least a first near field communication device, wherein the first set of credentials indicates information about a person, and wherein the information about the person comprises a license document and a restriction on what time of day the person may operate any vehicle;
program instructions to receive a second set of credentials from at least a second near field communication device, wherein the second set of credentials indicates information about a first vehicle, and wherein the information about the first vehicle comprises a restriction on what type of roadway the first vehicle can be operated;
program instructions to compare the first set of credentials to the second set of credentials;
program instructions to determine whether the person indicated by the first set of credentials has authority to operate the first vehicle, based on, at least, the comparison of the first set of credentials to the second set of credentials and a current time of day;
program instructions to determine that a date of expiration of the license document is within a predetermined time period;
program instructions to send an alert that the date of expiration of the license document is within the predetermined time period;
program instructions to receive an indication of an emergency from the person;
program instructions to alert an emergency service of the indication of the emergency;
program instructions to activate at least one device capable of monitoring an aspect of the emergency;
program instructions to receive data from the at least one device capable of monitoring an aspect of the emergency of the first vehicle;
program instructions to determine that the first vehicle has been involved in an accident, based on the received data;
program instructions to cause a near field communication device reader to scan for a third set of credentials from at least a third near field communication device associated with a second vehicle, wherein the third set of credentials is associated with the second vehicle; and
program instructions to store the third set of credentials.

16. The computer system of claim 15, further comprising:
program instructions, stored on the computer readable storage media for execution by at least one of the one or more processors, to, responsive to determining that the person indicated by the first set of credentials does not have authority to operate the first vehicle request input of an override code;
program instructions, stored on the computer readable storage media for execution by at least one of the one or more processors, to receive the override code; and
program instructions, stored on the computer readable storage media for execution by at least one of the one or more processors, to permit the first vehicle to be operated.

17. The computer system of claim 15, wherein the first set of credentials further comprises a biometric identifier, wherein the biometric identifier is a facial recognition device that compares a snapshot of the person's face to the license document photo.

18. The computer system of claim 15, wherein the second set of credentials comprises at least one of a license plate and an inspection document.

19. The computer system of claim 15, wherein the third set of credentials is associated with an operator of the second vehicle.

* * * * *